R. A. SMITH.
MEANS FOR FIRING AUTOMATICALLY SMUDGE POTS IN ORCHARDS.
APPLICATION FILED OCT. 6, 1913.
1,170,011.
Patented Feb. 1, 1916.
2 SHEETS—SHEET 1.
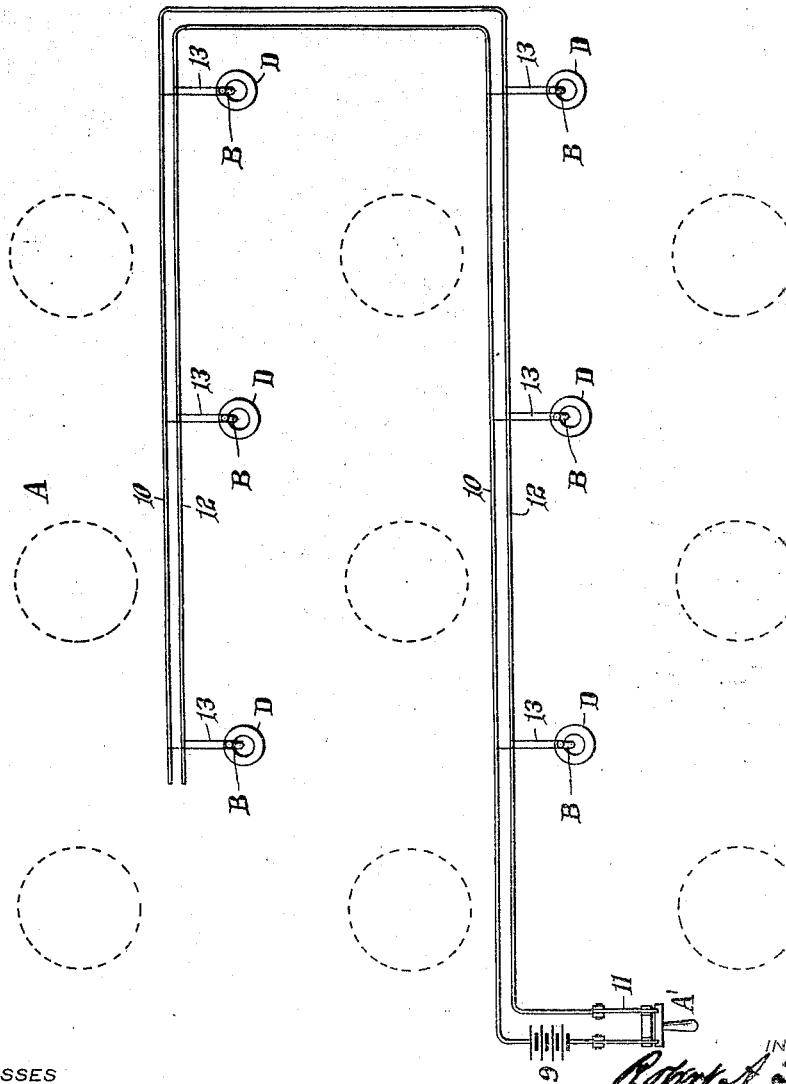
WITNESSES
Thomas M. Smith
Helen S. Holt
INVENTOR
Robert A. Smith
BY
Walter Douglas
ATTORNEY R. A. SMITH.
MEANS FOR FIRING AUTOMATICALLY SMUDGE POTS IN ORCHARDS.
APPLICATION FILED OCT. 6, 1913.
1,170,011.      Patented Feb. 1, 1916.
2 SHEETS—SHEET 2.
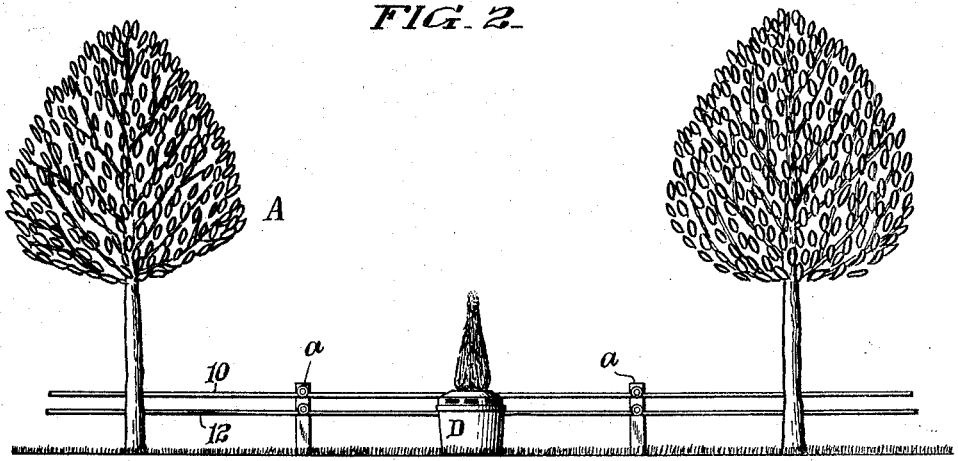
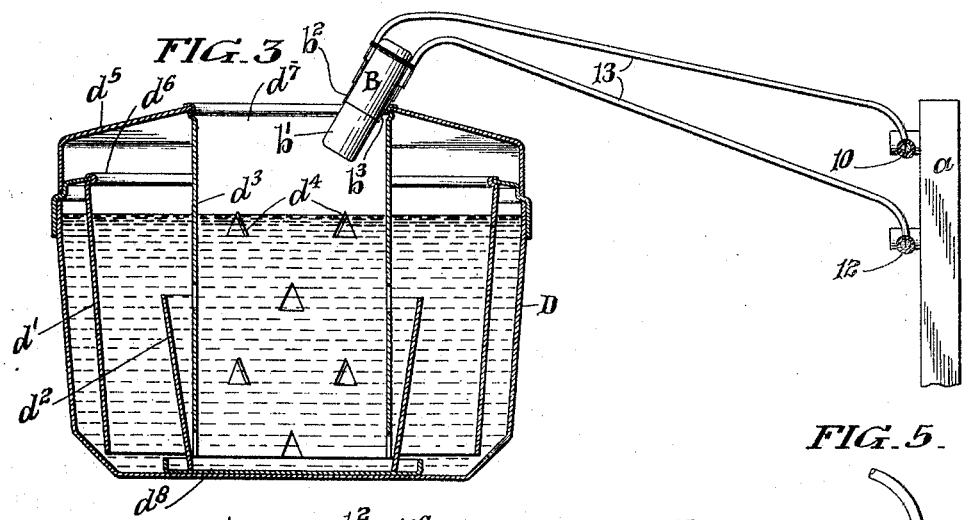
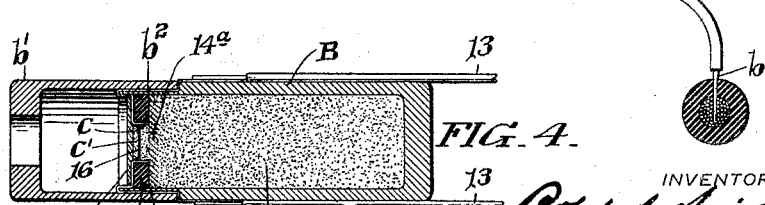

UNITED STATES PATENT OFFICE.

ROBERT A. SMITH, OF RIDLEY PARK, PENNSYLVANIA, ASSIGNOR TO PRECISION THERMOMETER AND INSTRUMENT COMPANY, OF PHILADELPHIA, PENNSYLVANIA, A CORPORATION OF PENNSYLVANIA.

MEANS FOR FIRING AUTOMATICALLY SMUDGE-POTS IN ORCHARDS.

1,170,011. Specification of Letters Patent. Patented Feb. 1, 1916.

Application filed October 6, 1913. Serial No. 793,559.

*To all whom it may concern:*

Be it known that I, ROBERT A. SMITH, a citizen of the United States, residing at Ridley Park, in the county of Delaware and State of Pennsylvania, have invented certain new and useful Improvements in Means for Firing Automatically Smudge-Pots in Orchards, of which the following is a specification.

My present invention has relation to means for electrically controlling the firing of smudge pots containing matter to be fired arranged about orchards, as an artificial means for raising the temperature of the atmosphere in periods of frost to prevent the trees from freezing or becoming frost bitten.

Hitherto it has been the general custom to arrange smudge pots about fruit trees, in an orchard containing crude petroleum and to fire manually with a gasolene torch, but this has been most unsatisfactory, because experience has demonstrated that it is impossible to secure men necessary for this work in large orchards and it is exceedingly slow work and invariably before manual firing of smudge pots can be conveniently accomplished, the fruit trees are frost bitten.

According to my invention, is controlled electrically the firing of the smudge pots of the orchard from a central station by the actuation of either a switch, the depressing of a key thereat, or other means of electrical contact, to simplify this work as well as almost instantly provide for the raising of the temperature of the atmosphere surrounding the trees to a point that will prevent possible freezing of the buds or fruit and hence avoiding many of the losses now occurring in fruit raising on a large scale.

My invention stated in general terms, consists of means to permit of the firing automatically of smudge pots, in orchards and embracing appliances or means arranged substantially as hereinafter described and claimed.

The nature and scope of my present invention will be more fully understood from the following description taken in connection with the accompanying drawings forming part hereof, in which—

Figure 1, is a view in diagrammatic plan of what represents an orchard with smudge pots about the same and with a cartridge suspended from each pot, included in an electric circuit from a source of energy, and with a knife switch at a central station for firing all of the cartridges simultaneously and instantly thereby igniting the fluid contents of the series of smudge pots arranged about the trees of the orchard, the whole embracing essential main features of my said invention. Fig. 2, is a side elevation of a section of the orchard, with the circuit from a source of energy to a smudge pot, the contents of which is shown inflamed, having been ignited automatically by a cartridge suspended therein and which ignition was effected from a remote central station of the orchard. Fig. 3, is a vertical sectional view through the smudge pot, showing a preferred internal arrangement thereof and a side elevation of a cartridge and its circuit connections, the cartridge being suspended thereinto from the upper part of said pot and the insulated circuit wires having pointed terminals for sticking between nested wires of the main circuit from the source of energy, the said terminals providing convenient means for detachably connecting cartridges of smudge pots with the source of energy for firing and for replacing with other cartridges, as required. Fig. 4, is an enlarged longitudinal central sectional view through the cartridge, showing particular essential internal arrangements of the same for insuring good practical results; and Fig. 5, is an enlarged elevational view of a broken section of the circuit wire from the cartridge with its pointed insulated terminal for sticking between nested small wires comprising the main electric circuit from the source of energy.

Referring to the drawings, A represents an orchard about which along the ground in Fig. 1, or along fencing *a*, as shown in Fig. 2, is strung electric circuit wires 10 and 12, with a knife blade switch 11, included therein at a central station $A^1$, adapted to establish or break the circuit from the source of energy 9. From the circuit 10, 12, are detachably stuck between the wires thereof, as in Fig. 5, the pointed terminals $b$, of a branch circuit 13, of a cartridge B, of a structural arrangement to be presently more fully explained.

The cartridge consists of a tubular box-like structure with a removable perforated cap $b^1$. In the offset part of the box for the reception of the cap $b^1$ are arranged two flat metal strips $b^2$ and $b^3$, with which the branch circuit 13, of the cartridge B, is made a part. The cartridge is provided with an igniting mixture 14, composed of sulfur, saltpeter and charcoal, in varying proportions. This mixture is more or less loosely packed in the major portion as designated by the compartment 14, in Fig. 4. In the upper part of said compartment is provided a button $14^a$, of the same matter, mixed with gum arabic or other gummy substance to harden and thus to not only protect the described loose composition matter from beneath the button $14^a$, but more particularly to enable the said matter in its button-like form to simply burn, when ignited, rather than to explode, with a report, which it would do, as practice has thoroughly demonstrated, if the gummy substance had not been mixed with the igniting powder of the character above explained and been compressed into the said button $14^a$, Fig. 4. Above this button $14^a$, is placed a fiber or similar material gasket 15, with a central opening $c$, forming a pocket to receive a small quantity of readily ignitible material such as gun powder $c^1$. Spanning the said opening is a small nickel-steel or other type of wire 16, directly in connection with the two flat strips $b^2$ and $b^3$, of the branch circuit 13. The loose powder is held in the opening $c$, of the pocket by means of an outer water-proof diaphragm $b^4$, as clearly shown in Fig. 4. When the current is on, the wire 16, is quickly melted and thereby is fired the loose gun powder $c^1$, about the same in the pocket of the gasket 15, and immediately the powder button $14^a$, is inflamed and then quickly in succession thereafter the loose powdered matter 14, of the cartridge to cause an inflaming of the petroleum mixture of the smudge pot D, in which incliningly, the cartridge B, is suspended and above the fluid contents thereof, for example, as fully illustrated in Fig. 3.

The smudge pot D, is preferably arranged with a series of internal partitions $d^1$, $d^2$ and $d^3$, dividing into sections the same, in perforated communication with each other, as at $d^4$; certain of them being capped as at $d^5$ and $d^6$, while the central partition $d^7$, is uncapped and extends to a dish-shaped internal plate $d^8$, in the bottom of the pot, Fig. 3. The central perforated tubular member $d^7$, of the pot is connected with the cap $d^5$, and extends downward to about the upper edge of the dish-shaped plate $d^8$, whereby as so arranged, the petroleum is poured into the central tubular member $d^7$, and passes through the different perforated partitions and capped chambers of the pot, to conserve the vapors arising from the oil and hence to facilitate the burning thereof. Upon the inflaming of these pots, they will continue to burn for several hours.

The smudge pot, as illustrated in Fig. 3, and as above briefly described, has been found in practice to give good results for the defined purposes of my present invention in the application of a cartridge B, suspended from the top of the same and inclined downwardly thereinto above the level of the fluid contents thereof and when the cartridge is fired the pot will be readily ignited by bursting into a torch-like flame for example, as illustrated in Fig. 2, and the heat therefrom being given off for several hours from one charge, is generally sufficient to preserve the fruit against frosty temperatures or of being frost bitten. In fact, as these pots are scattered about the orchard and if all are inflamed at the same time there is established almost at once a more or less uniform temperature around the trees, which otherwise could not possibly be done, particularly if the creating of such an atmosphere about the orchard trees was dependent upon manual torch lighting of the pots D, as in the past to prevent the buds or fruit being frozen or frost bitten.

It will be manifestly obvious that the cartridge as described may be varied as to its detailed arrangement without departing from my invention; hence I do not wish to be understood as limiting myself to all the details of the same as hereinbefore explained.

Having thus described the nature and objects of my said invention, what I claim as new and desire to secure by Letters Patent is:—

1. A cartridge packed with an igniting powder, the cartridge having a button of ignitible material and a gummy substance, a gasket located adjacent to the button having a pocket for holding loose powder and means spanning the gasket and in connection with contacts of said cartridge, substantially as and for the purposes described.

2. A cartridge containing an igniting material separated by a button of compressed ignitible material, a gasket having an opening forming a pocket for loose igniting material and said button of ignitible material separating the main body of ignitible material from the loose ignitible material in the pocket of said gasket, and means spanning said opening and adapted to be heated or consumed, substantially as and for the purposes described.

In witness whereof, I have hereunto set my signature in the presence of the two subscribing witnesses.

ROBERT A. SMITH.

Witnesses:
THOMAS M. SMITH,
HELEN S. HOLT.

Copies of this patent may be obtained for five cents each, by addressing the "Commissioner of Patents, Washington, D. C."